United States Patent
Armbrust et al.

(10) Patent No.: US 12,430,339 B2
(45) Date of Patent: Sep. 30, 2025

(54) PIPELINED EXECUTION OF DATABASE QUERIES PROCESSING STREAMING DATA

(71) Applicant: Databricks, Inc., San Francisco, CA (US)

(72) Inventors: Michael Paul Armbrust, Berkeley, CA (US); Alexander Balikov, Kirkland, WA (US); Boyang Peng, Santa Clara, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/511,902

(22) Filed: Nov. 16, 2023

(65) Prior Publication Data
US 2025/0165477 A1   May 22, 2025

(51) Int. Cl.
*G06F 16/2455* (2019.01)
*G06F 9/48* (2006.01)
*G06F 16/2453* (2019.01)

(52) U.S. Cl.
CPC ...... *G06F 16/24568* (2019.01); *G06F 9/4881* (2013.01); *G06F 16/24542* (2019.01)

(58) Field of Classification Search
CPC ......... G06F 16/24568; G06F 16/24542; G06F 9/4881
See application file for complete search history.

(56) References Cited

U.S. PATENT DOCUMENTS

| | | | |
|---|---|---|---|
| 2014/0280766 A1* | 9/2014 | Banerjee | H04L 65/60 709/219 |
| 2019/0102431 A1* | 4/2019 | Bishnoi | G06F 16/24554 |
| 2020/0257689 A1* | 8/2020 | Armbrust | G06F 16/24568 |

* cited by examiner

*Primary Examiner* — Apu M Mofiz
*Assistant Examiner* — Husam Turki Samara
(74) *Attorney, Agent, or Firm* — Fenwick & West LLP

(57) ABSTRACT

A database system performs pipelined execution of queries that process batches of streaming data. The database system compiles a database query to generate an execution plan and determines a set of stages based on the execution plan. The database query processes streaming data comprising batches. A scheduler schedules pipelined execution stages of the database query. Accordingly, the database system performs execution of a particular stage processing a batch of the streaming data in parallel with subsequent stages of the database query processing previous batches of the streaming data. The system further maintains watermarks for different stages of the database query.

17 Claims, 11 Drawing Sheets

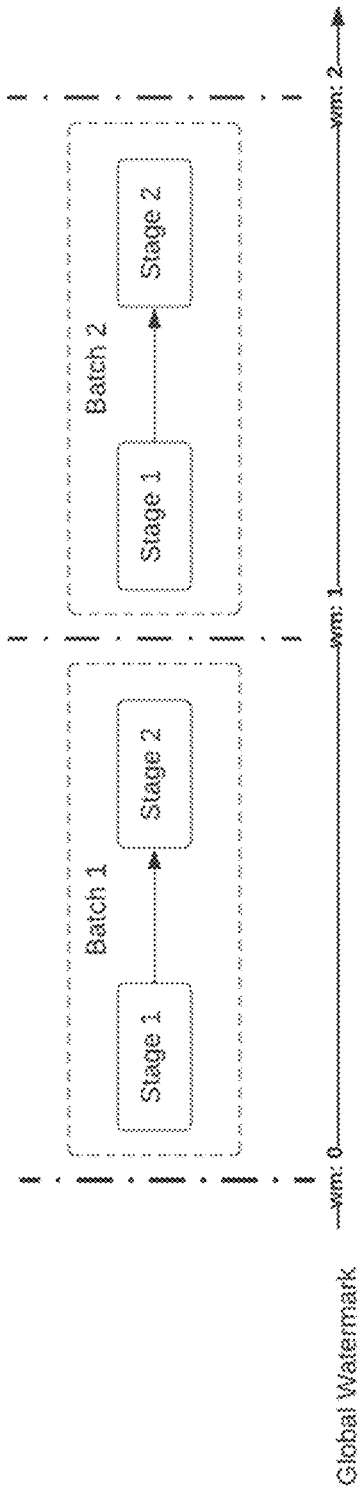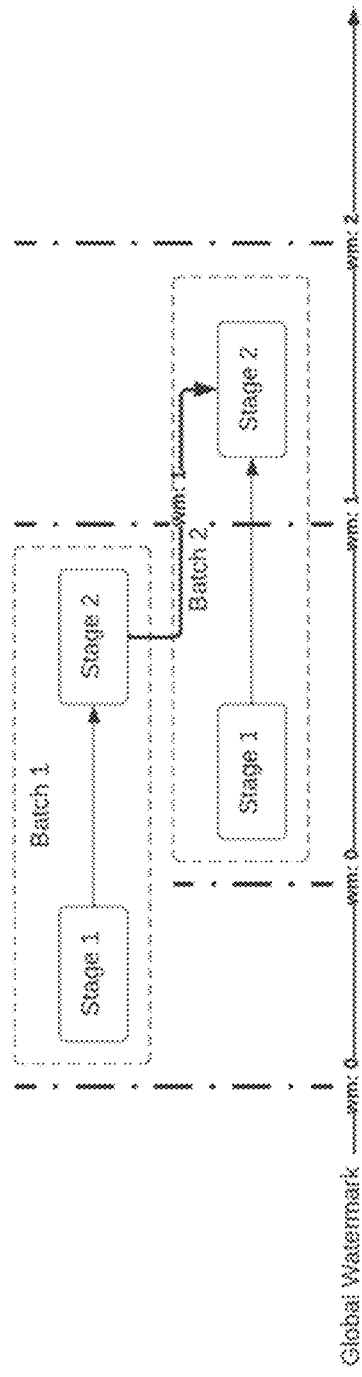
FIG. 9A
FIG. 9B

PIPELINED EXECUTION OF DATABASE QUERIES PROCESSING STREAMING DATA

TECHNICAL FIELD

This disclosure relates generally to processing of streaming data, and more particularly to pipelined execution of database queries processing streaming data.

BACKGROUND

A data processing service manages a significant amount of data in various forms, such as raw data or data tables. In some instances, the data processing service performs operations on streaming data. Streaming data may be obtained from various sources such as events generated by software running on distributed systems, sensor data of internet of things, clickstream data, online activities of various kinds, and so on. Streaming data may be static data or data that is continuously and dynamically ingested from a data source.

Typically, the streaming data is processed by one or more clusters in a computing system, for example using Spark™ clusters. A database system may receive and execute database queries for processing streaming data. Execution of such database queries can have several sources of inefficiencies, for example, waiting for input/output resources, scheduling overheads, straggler tasks causing delays, and so on. As a result, execution of such database queries may result in very low utilization of the clusters of the computing system, for example, as low as 3%-10% when executing benchmarks.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 9A illustrates how watermark is advanced as streaming data is processed sequentially according to an embodiment.

FIG. 9B illustrates how watermark is advanced as streaming data is processed in a pipelined manner according to an embodiment.

Figure 1:
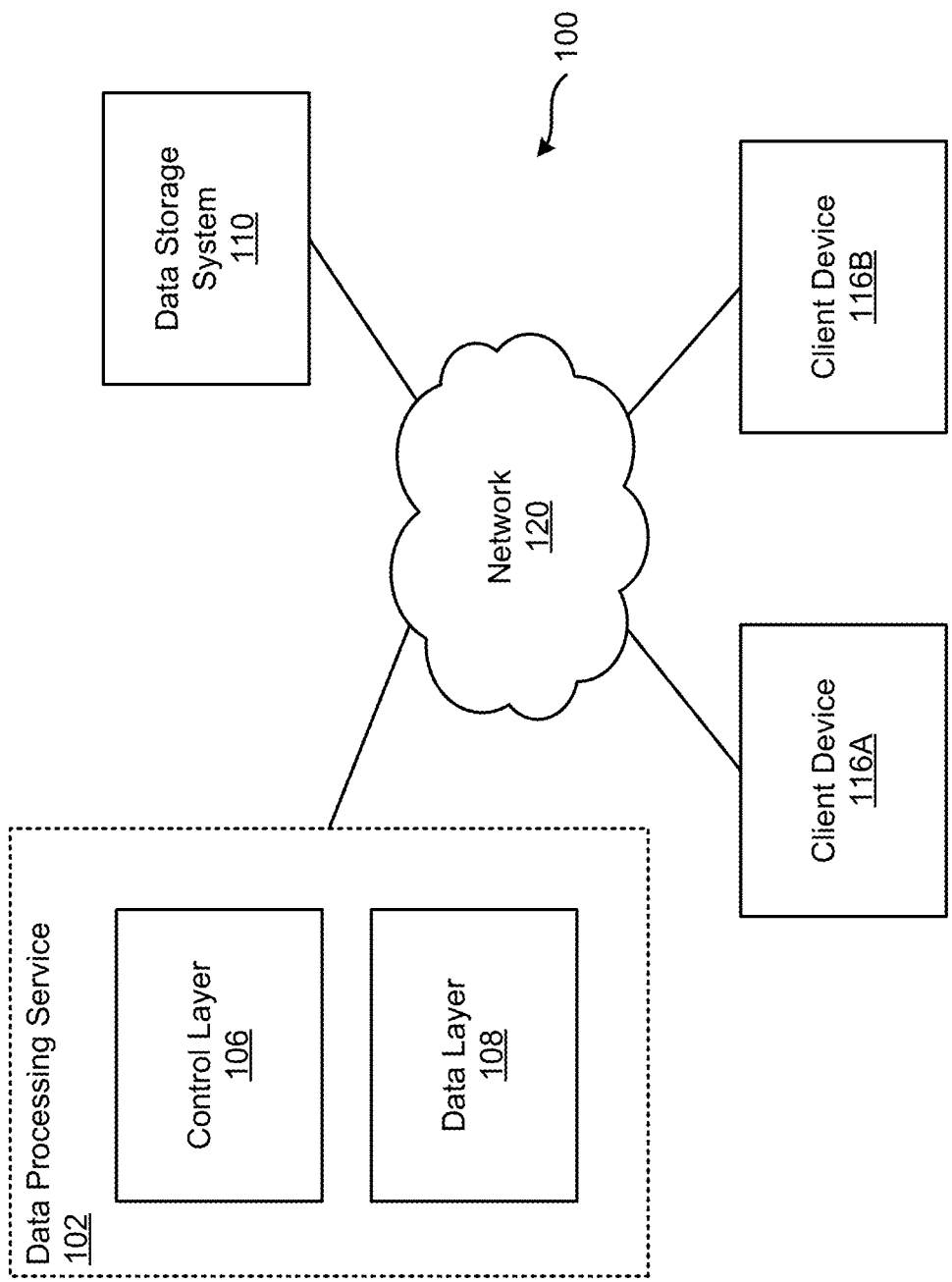
FIG. 1 is a high-level block diagram of a system environment for a data processing service, in accordance with an embodiment.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (computer-readable medium or method) for purposes of illustration only. One skilled in the art will readily recognize from the following description that alternative embodiments of the structures and methods illustrated herein may be employed without departing from the principles described herein.

Overview

The disclosed configurations provide a method (and/or a computer-readable medium or computer system) for pipelined execution of database queries processing streaming data. According to an embodiment, the system is a database system that executes database queries that processes streaming data as batches. Typically, the database system processes streaming data using small batches, also referred to herein as a minibatches or a microbatches.

According to an embodiment, the database system receives a database query processing the streaming data. The database system compiles the database query to generate an execution plan that includes a plurality of operators. The database system determines a set of stages of the database query, each stage corresponding to a subset of operators of the execution plan. The output of a stage (e.g., stage S1) is provided as input to the next stage (e.g., stage S2). The streaming data is divided into batches of data. For example, the streaming data may include a batch B1 of data following by a batch B2 of data. The database system schedules pipelined execution of stages of the database query. For example, the database system may schedule execution stage S1 for the batch B2 after completion of execution of stage S1 for batch B1 but in parallel with execution of stage S2 for batch B1. Accordingly, execution of certain stages for a batch is performed in parallel with execution of that stage or other stages for other batches.

By pipelining the execution of batches of streaming data, various sources of inefficiency in query execution are minimized and the database system achieves better utilization. Use of pipelined execution of database queries provides performance improvements in throughput for benchmark queries and therefore improves efficiency of execution of database queries for streaming data.

FIG. 1 is a high-level block diagram of a system environment 100 for a data processing service 102, in accordance with an embodiment. The system environment 100 shown by FIG. 1 includes one or more client devices, e.g., 116A, 116B (generally 116), a network 120, a data processing service 102, and one or more data storage systems 110. In alternative configurations, different and/or additional components may be included in the system environment 100.

The data processing service 102 is a service for managing and coordinating data processing services to users of client devices 116. The data processing service 102 may manage one or more applications that users of client devices 116 can use to communicate with the data processing service 102. Through an application of the data processing service 102, the data processing service 102 may receive requests from users of client devices 116 to perform one or more data processing functionalities on data stored, for example, in the data storage system 110. The requests may include query requests, analytics and intelligence requests, or machine learning and artificial intelligence requests, on data stored in the data storage systems 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured on one or more servers and/or a cloud infrastructure platform. In one embodiment, the control layer 106 receives data processing requests and coordinates with the data layer 108 to process the requests received from the client devices 116. The control layer 106 may schedule one or more jobs related to a request or receive requests to execute one or more jobs from the user directly through a respective client device 116. The control layer 106 may distribute the jobs to components of the data layer 108 where the jobs are executed.

Returning to the discussion of FIG. 1, the control layer 106 of the data processing service 102 is additionally capable of configuring clusters in the data layer 108 that are used to execute tasks for streaming data. For example, a user of a client device 116 may submit a request to perform one or more query operators on the incoming data and may specify a number of clusters (e.g., four clusters) on the data layer 108 be activated to process the request with certain memory requirements. Responsive to receiving this information, the control layer 106 sends instructions to the data layer 108 to instantiate the requested number of clusters and configure the clusters according to the requested memory requirements.

The data layer 108 includes multiple instances of clusters of computing resources that execute one or more operations received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. A tenant of the data processing service 102 may be an entity (e.g., business organization, university, individual user) that may be associated with an established account of the data processing service 102. The data processing service 102 may allocate storage to store data for a tenant and/or computing resources to perform one or more processing operations on the data for the tenant. For example, a respective data layer instance can be implemented for each respective tenant. However, it is appreciated that the data layer 108 can also be configured as a single tenant architecture.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data configured on a cloud platform and may include a commercially provided distributed storage system service. Thus, the data storage system 110 may be managed by the same entity that manages the data processing service 102 or by a separate entity than an entity that manages the data processing service 102. In one embodiment, the data storage system 110 may be included in the data layer 108.

In one embodiment, the data storage system 110 may store the results of operators executed on streaming data for a tenant. For example, as the cluster computing system executes operations on streaming data, the results of the operations (e.g., state information) per microbatch may be stored in a data storage system 110 dedicated to the tenant managing the data. Moreover, the data storage system 110 may also store metadata on the streaming data and results of executing operations on the streaming data, including metadata checkpoint files.

The client devices 116 are computing devices that provide for display of information to users and communicate user actions to the systems of the system environment 100. While two client devices 116A, 116B are illustrated in FIG. 1, in practice many client devices 116 may communicate with the systems (e.g., data processing service 102) of the system environment 100. In one embodiment, a client device 116 is a conventional computer system, such as a desktop or laptop computer. As another example, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one example embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the systems of the system environment 100 through a web interface or an application programming interface (API) running on a native operating system of the client device 116, such as IOS® or ANDROID™

Data Storage System

Figure 2:
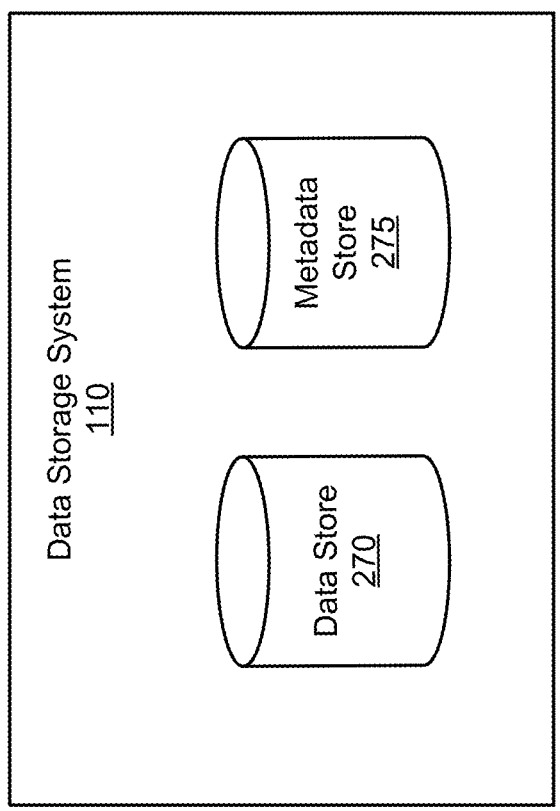
FIG. 2 illustrates a block diagram of an architecture of the data storage system, in accordance with an embodiment.

FIG. 2 illustrates a block diagram of an architecture of the data storage system 110, in accordance with an embodiment. As illustrated in FIG. 2, the data storage system 110 includes a data store 270 and a metadata store 275. The data storage system 110 may have multiple instances of the data store 270 and the metadata store 275, each dedicated to storing data for a tenant of the data processing service 102. In one embodiment, the data store 270 stores data in a format of a data table. A data table may include a set of records, where each record may include values for one or more features or keys. A feature may represent a measurable piece of data that can be used for analysis, such as, login account, timestep, etc. A feature may refer to any characteristic of the data that can be associated with one or more values of various data types, such as discrete or continuous values, string values, and the like. In one embodiment, the records may span across multiple rows of the data table and the features may span across multiple columns of the data table. In other embodiments, the records may span across multiple columns and the features may span across multiple rows. For example, a data table associated with a company may include a plurality of records each corresponding to a login instance of a respective user to a website, where each record includes values for a set of features including user login account, timestamp of attempted login, whether the login was successful, and the like.

In one embodiment, a data table may be stored in the data store 270 in conjunction with metadata stored in the metadata store 275. As described above, the metadata store 275 may include one or more metadata files for a data table. In some embodiments, the metadata store 275 stores metadata in the form of one or more transaction logs. A transaction log for a data table is a log recording a sequence of transactions that were performed on the data table. A transaction may perform one or more changes to a data table that may include removal, modification, or addition of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110. The metadata in the transaction log may record removal, update, or addition of data files to a data table.

Control Layer

Figure 3:
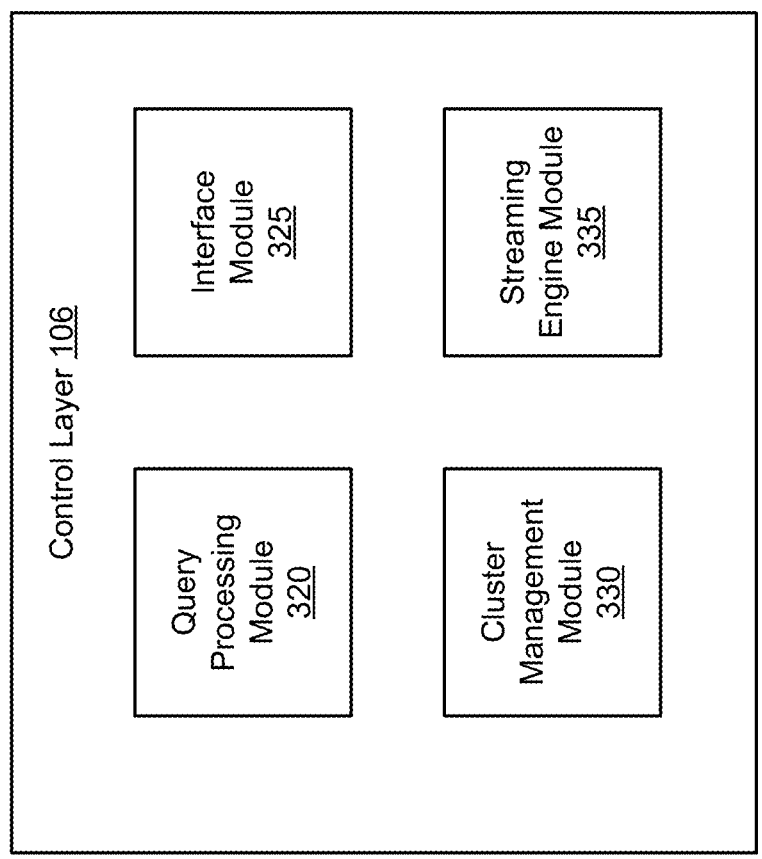
FIG. 3 is a block diagram of an architecture of a control layer, in accordance with an embodiment.

Referring now to FIG. 3, illustrated is a block diagram of an architecture of a control layer 106, in accordance with some example embodiments. As shown, the control layer 106 includes a query processing module 320, an interface module 325, a cluster management module 330, a streaming engine module 335.

The query processing module 320 receives and processes queries that access data stored by the data storage system 110. The query processing module 320 may reside in the control layer 106. The queries processed by the query processing module 320 are referred to herein as database queries. The database queries may be specified using a declarative database query language such as the SQL. The query processing module 320 compiles a database query specified using the declarative database query language to generate an execution plan. The execution plan represents a set of operations generated by the query processing module 320 from a database query to process data stored by the data storage system 110 (e.g., in a database) as specified by the database query and return the results requested. According to an embodiment, the execution plan is represented as a tree data structure or a graph data structure (e.g., a directed acyclic graph) where the nodes are various operators that perform specific computations needed. The graph structure includes an edge from a node N1 to node N2 if the output generated by the operator corresponding to node N1 is provided as an input to the operator corresponding to node N2. The query processing module 320 may generate code representing executable instructions for implementing the execution plan for executing a database query. The generated code includes a set of instructions for each operator specified in the execution plan. The generated code is specified using a programming language that may be compiled and executed. The query processing module 320 executes the generated code corresponding to the database query. The query processing module 320 accesses the data stored in the data storage system 110 as specified by the database query and performs the various instructions as specified by the generated code to return the results according to the database query. For example, if the database query processes records of a table, the query processing module 320 may access records of the database table from the data storage system 110 and process each record as specified by the database query.

According to an embodiment, the query processing module 320 groups the operators of the execution plan to determine stages of the database query. The query processing module 320 may traverse the query graph representation of the execution plan to determine the stages by grouping subsets of operators that are typically connected with each other via edges.

The query processing module 320 further classifies each stage as one of stateless of stateful. The query processing module 320 stores metadata (e.g., a flag) describing each stage as stateful or stateless. A stateful stage stores data corresponding to a batch of streaming data for use in performing the computation for a subsequent batch of streaming data. A stateless stage does not store any data corresponding to a batch for use in performing computation of a subsequent batch and accordingly computations of the stage for the two batches may be performed in parallel.

The interface module 325 provides an interface and/or a workspace environment where users of client devices 116 (e.g., users associated with tenants) can access resources of the data processing service 102. For example, the user may retrieve information from data tables associated with a tenant and submit data processing requests, such as query requests on the data tables, through the interface provided by the interface module 325. The interface provided by the interface module 325 may include electronic notebooks, libraries, experiments (e.g., data and/or analysis), and/or queries submitted by the user. In some embodiments, a user may access the workspace via a user interface (UI), a command line interface (CLI), and/or through an application programming interface (API) provided by the interface module 325.

The cluster management module 330 manages clusters created in the data layer 108 and/or the control layer 106. In one embodiment, the cluster management module 330 manages the lifecycle of clusters in a workspace environment of a tenant. For example, the cluster management module 330 may create a cluster, configure settings for the cluster, and terminate a cluster in the workspace environment. For example, a user of a client device 116 with access to a workspace may request creation of one or more clusters in the data layer 108 and configure various settings, such as access settings, security settings, node type, and processor settings, and the like. As another example, the cluster management module 330 may obtain information on the use of resources of each cluster and display such information not the user. The cluster management module 330 may also terminate the clusters upon user request or the user can also configure auto-termination after a predetermined period of time through the cluster management module 330.

The streaming engine module 335 receives requests to process streaming data from one or more data sources. The requests may include, for example, requests to ingest data from file sources for reading files written in a file directory as a stream of data, a streaming platform (e.g., Kafka) source that reads data from a streaming platform, or a socket source that reads UTF8 text or other modalities of data from a socket connection. The requests may also include requests to perform one or more operators on the streaming data. In one embodiment, the operator on a stream of data is a stateful operator, in which the result of performing the operator at a current time (e.g., for a current microbatch of data) is dependent on state information at a previous time (e.g., for a previous microbatch of data). The streaming engine module 335 manages clusters in the data layer 108 (or the control layer 106) to ingest stream of data from the requested data source and perform one or more stateful operators on the data.

Figure 4:
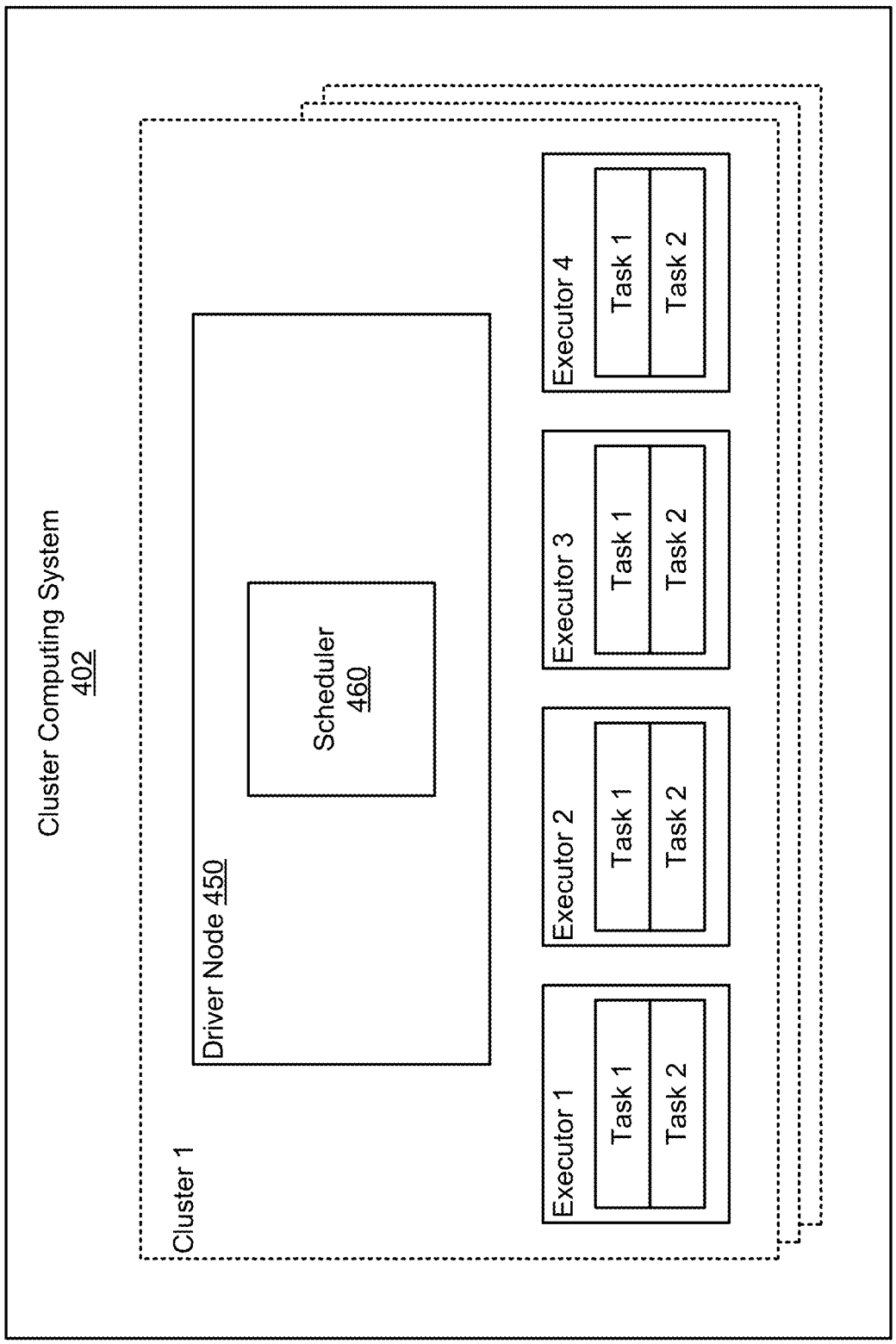
FIG. 4 is a block diagram of an architecture of a cluster computing system, in accordance with an embodiment.

FIG. 4 is a block diagram of an architecture of a cluster computing system 402, in accordance with an embodiment. In one embodiment, the cluster computing system 402 may be configured in the data layer 108 and/or the control layer 106 upon request by a user. In some embodiments, the cluster computing system 402 includes driver node 450 and worker pool including a set of executors. The driver node 450 receives one or more jobs for execution, optionally divides a job into job stages, and provides job stages to executors, receives job stage results from the executors of the worker pool, and assembles job stage results into complete job results, and the like.

The worker pool can include any appropriate number of executor nodes (e.g., 4 executors, 12 executors, 256 executors). Each executor in the worker pool includes one or more task engines for executing one or more tasks. In one embodiment, a task engine performs single-threaded task execution in which a task is processed using a single thread of the CPU. In one embodiment, an executor is configured with a local disk or cache that can be used by the task engines of the executor to store information, such as state information after executing a partition task for a current microbatch. The executor distributes one or more tasks (e.g., for a job stage) to one or more task engines and provides the results of the execution to the driver node 450.

In one embodiment, the driver node 450 receives from the streaming engine module 335 requests from users to ingest streaming data from one or more data sources, and requests to execute one or more stateful operators on the streaming data. In one embodiment, the driver node 450 receives requests to execute two or more types of stateful operators on streaming data. For example, for streaming data including a stream of sensor data for one or more sensors on equipment (e.g., farming equipment, industrial equipment, transportation vehicles), a first request may request to perform a stateful operator of aggregate, and a second request may request to perform a stateful operator of join on the streaming data.

For a current microbatch, the driver node 450 partitions the batch of data into a set of partition tasks and distributes the partition tasks to the executors of the cluster. In one instance, each partition task is identified by generating a hash for one or more key values (e.g., sensor identifiers or user identifiers). Thus, a partition task may be dedicated to performing a stateful operator on a subset of records in the microbatch with a hash value matching the hash value for the partition task. In one instance, the driver node 450 assigns one partition task to one task engine of a respective executor in a cluster. However, it is appreciated that in other embodiments, a partition task may be assigned to multiple task engines, or one task engine may process multiple partition tasks.

As shown in FIG. 4, in one embodiment, the driver node 450 includes a scheduler 460 also referred to as the task scheduler module, according to one embodiment. The scheduler 460 schedules tasks among the available set of executors. For example, the scheduler 460 may schedule execution of different stages of a database query for processing different batches of streaming data that is received.

The task engines of the executors execute the assigned partition tasks. In one embodiment, the task engines of a respective executor may store state information for the current microbatch to the local disk or cache of the executor, such that the partition tasks of the next microbatch can access the state information. The state information for a current microbatch is also stored to cloud storage, for example, to a root bucket of the data storage system 110 for the tenant. After the execution is complete, the executor collects one or more execution statistics including processing times for each partition task executed on a respective task engine, number of partition tasks executed on the executor, and the like.

Pipelined Execution of Database Queries Processing Streaming Data

Figure 5:
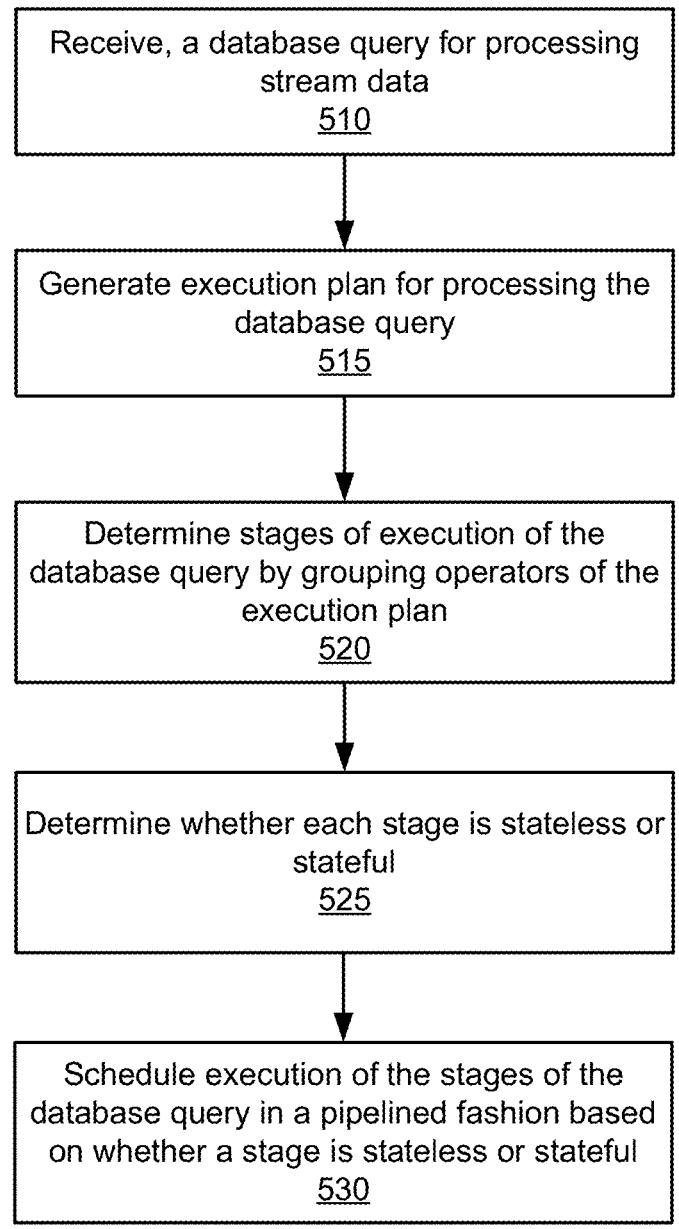
FIG. 5 shows a flowchart illustrating the processing of database queries using pipelined execution of batches, according to an embodiment.

FIG. 5 shows a flowchart illustrating the processing of database queries using pipelined execution of batches, according to an embodiment. The steps may of the process may be executed in an order different from that indicated in the flowchart. The steps are executed by a system, for example, a database system for processing database queries using streaming data.

The database system receives 510 a database query for processing streaming data. The database system compiles the database query to generate 515 an execution plan. The execution plan comprises operators representing specific operations that are composed to process the query. Accordingly, an output of an operator may be provided as input to one or more operators and similarly the input of an operator may be generated by another operator. Accordingly, the execution plan of a database query may be represented as a graph of operators wherein a node represents an operator and there is an edge from an operator O1 to operator O2 if the data output by operator O1 is fed as input to the operator O2. The database system determines 520 stages for that query by grouping a set of operators that are directly connected to each other. According to an embodiment, a stage may be separate from another stage by a shuffle operation. A shuffle operation performs exchange of data between partitions of data processed for a database query. Data is moved between worker nodes processing different partitions if the partitions reside on different machines.

The database system further determines 525 whether a stage is stateless or stateful. A database query is stateless if the database query does not need to store results of previous data (e.g., previous batch) for the computation based on current batch of data. In contrast, stateful query stores partial results based on a previous batch to determine the results based on current batch. Similarly, a stage of a database query is stateless if the stage does not need to store results of previous data (e.g., previous batch) for the computation based on current batch of data. Similarly, a stage of a database query is stateful if the stage stores partial results based on a previous batch to determine the results based on current batch. For example, if the stage (or the database query) computes a result by aggregating data that is received from the stream, the stage (or database query) may compute the aggregate value for each batch and combine with aggregate values of the previous batches. Accordingly, the aggregate value based on the previous batches represents a state that the stage (or the database query) stores to compute the aggregate value based on the current batch of data. In contrast, an example stateless stage (or database query) computes a transformation of each data value received independent of other data values. Accordingly, the stage (or database query) does not store any state based on previous batches since the computation corresponding to each data value is performed independent of the previous data values received.

The database system schedule 530 execution of the stages of the database query. The execution of each stage is determined based on whether the stage is stateful or stateless. In particular the system uses parallel execution without dependencies on previous batch of data of the stage is stateless. If the stage is stateful, the system schedules pipelined execution of the stage such that the execution of a previous batch for the stage is completed before execution of the current batch for the stage is started.

Figure 6A:
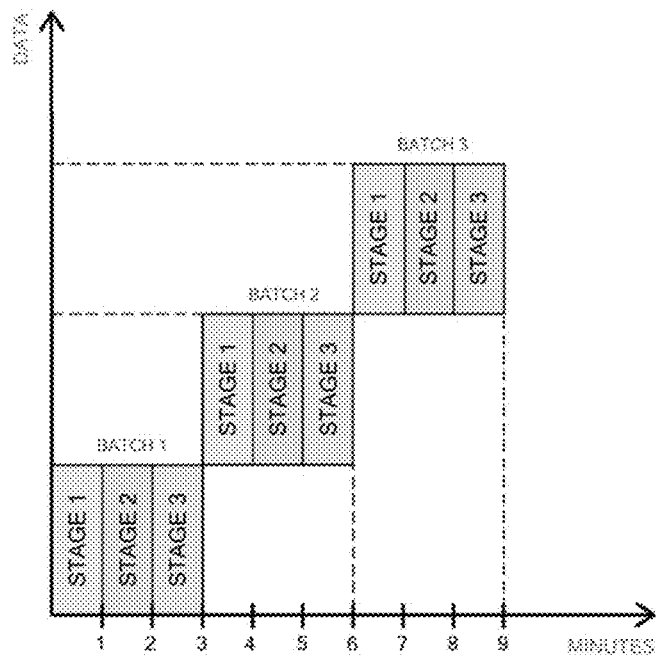
FIG. 6A illustrates execution of a database query processing streaming data in a sequential fashion, according to an embodiment.

FIG. 6A illustrates execution of a database query processing streaming data in a sequential fashion, according to an embodiment. The X-axis shows time in units, for example, minutes and the Y-axis shows data processed. The database system completes processing of batch 1 before starting processing of batch 2 and similarly completes processing of batch 2 before starting processing of batch 3. Accordingly, the embodiments illustrated in FIG. 6A execute one batch at a time for a database query processing streaming data. Furthermore, only one stage of the database query processes a batch of the streaming data at a time. Accordingly, the different stages of a query are executed sequentially. For the example illustrated in FIG. 6A, each batch takes 3 minutes to run. Accordingly, the total execution time for 3 batches is 9 minutes when executing the batches sequentially.

Executing batches in sequential fashion can lead to poor utilization of the underlying resources leading to suboptimal performance. To improve resource utilization and performance, the database system pipelines the execution of batches i.e., the execution of some batches may overlap with the execution of other batches as illustrated in FIG. 6B.

Figure 6B:
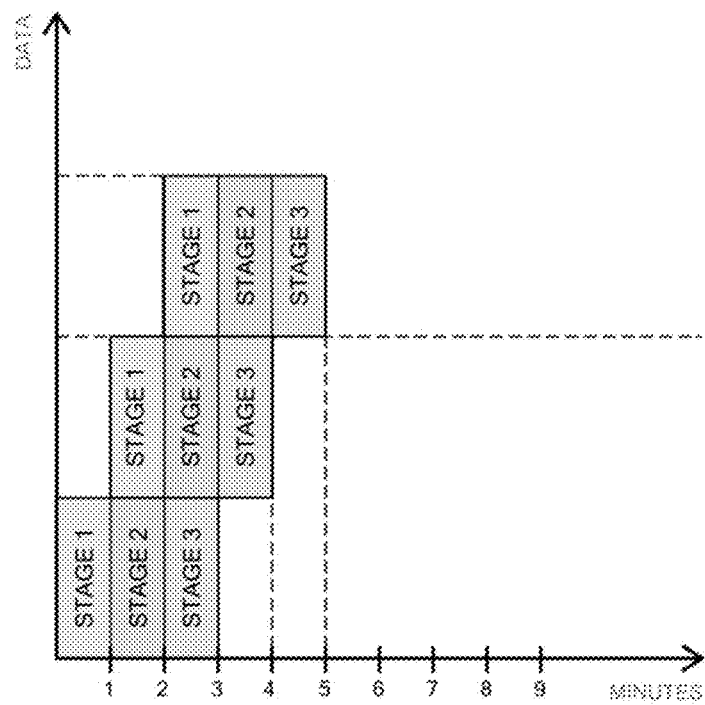
FIG. 6B illustrates execution of a database query processing streaming data in a pipelined fashion, according to an embodiment.

FIG. 6B illustrates execution of a database query processing streaming data in a pipelined fashion, according to an embodiment. FIG. 6B illustrates execution of the batches shown in FIG. 6A by the system in a pipelined fashion. As shown in FIG. 6B, a particular stage starts executing when the same stage in the previous batch has finished execution. In other embodiments, this constraint is not necessary, and a particular stage may start execution even if the same stage in the previous batch has not finished execution.

For stages that are stateless the system schedules execution so that a particular stage executing the previous batch does not have to finish before the same stage in the current batch can start executing. For stateless stages there typically is no dependency to previous stages. Thus, the execution of stateless stages can overlap among different batches.

However, the database system schedules execution of stateful stages in a pipelined manner. The database system monitor state changes and updates them sequentially to maintain logical correctness. For the execution of stateful stages, the database system ensures that the stateful stage execution of a previous batch is completed before the execution of the stateful stage for the current batch is started.

The pipelined execution of the database queries by the database system results in performance improvement. The speedup obtained by pipelining execution of batches can be characterized by the following equation.

$$R = (K*N*T)/((K+N-1)*T)$$

In this equation R is the speed up ratio representing improvement in execution time as a result of pipelining, T represents execution time per stage, K represents number of stages per batch, i.e., the pipeline depth, and N represents number of batches. Accordingly, the speedup is a ratio of the product of K and N divided by a term based on the sum of K and N.

FIG. 6A depicts execution of 3 micro-batches sequentially which results in a total execution time of 9 minutes while FIG. 6B depicts execution of the same 3 micro-batches in a pipelined fashion which results in a total execution time of 5 minutes. For the example depicted in FIGS. 6A-B, the speed up due to pipelining is $(3*3*1)/((3+3-1)*1)=1.8$. As the number of stages increase the speedup to pipelining increases as well. The ideal speedup equals the pipeline depth or number of stages.

According to an embodiment, the performance improvement resulting from pipelining if different batches are executed in parallel. The database system achieves maximum performance if the number of cores available for parallel execution is at least equal to K, i.e., the number of stages per batch or the depth of the pipeline.

According to various embodiments, the database system satisfies following requirements while performing pipelined execution if there are inter-batch dependencies among stages, i.e., stateful stages of stateful queries. The current micro-batch execution is started after the execution of the previous batch is started. The database system serializes writes to offset log and commit log. Stateful stages are executed sequentially across batches.

Figure 7:
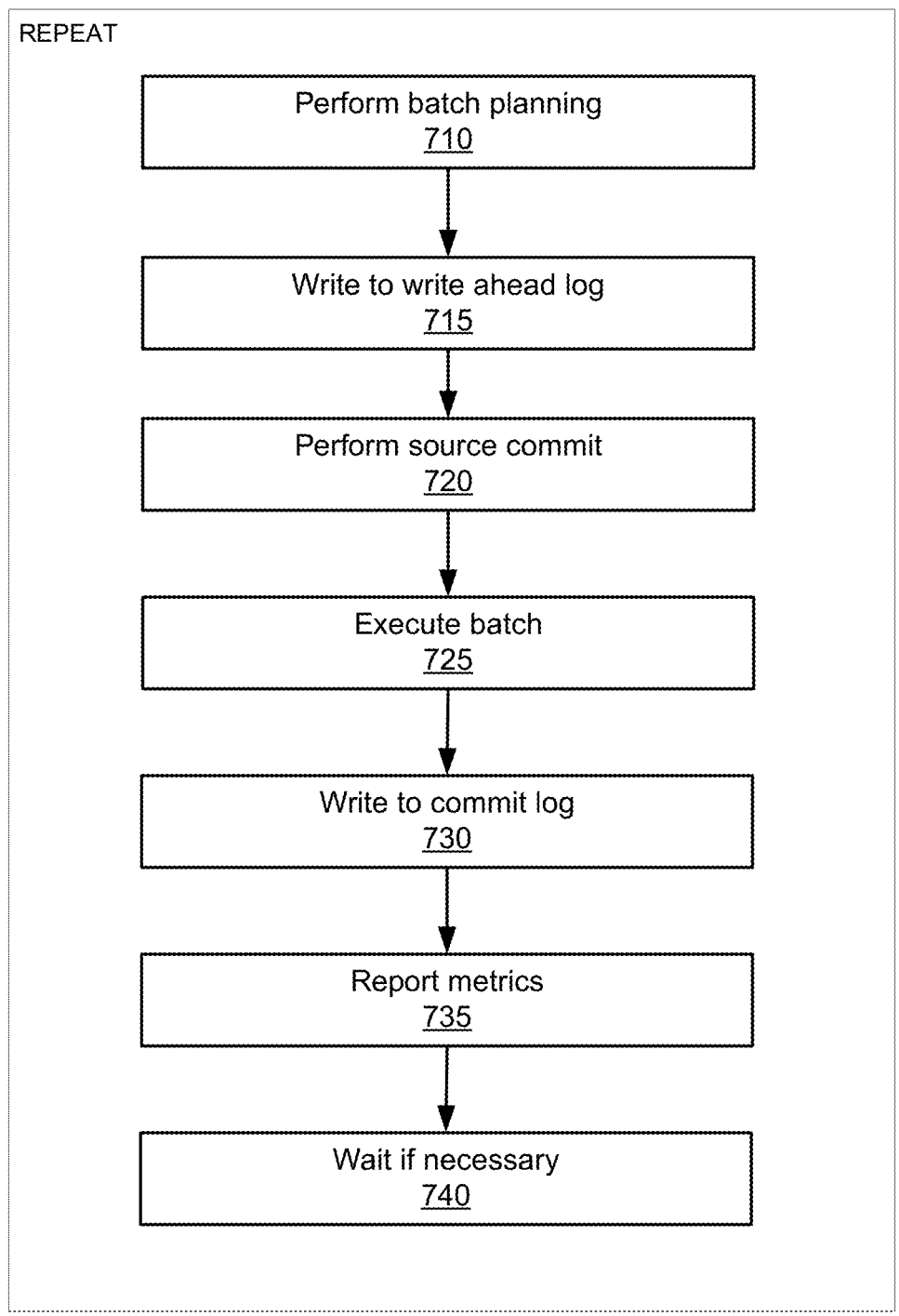
FIG. 7 is a block diagram illustrating an example machine to read and execute computer readable instructions, in accordance with an embodiment.

FIG. 7 is a flowchart illustrating the process of execution of each batch, according to an embodiment. The steps may of the process may be executed in an order different from that indicated in the flowchart. The steps are executed by a system, for example, a database system for processing database queries using streaming data. The steps shown in the process are repeated for each batch.

The database system performs 710 batch planning by determining the slice of data that will be processed for the current batch. The database system writes 715 to write ahead log (or journal) indicating that the processing of the batch is starting. The write ahead log may be used for executing the batch in case of system failures. The database system performs 720 source commit by informing the source (e.g., external source from which the streaming data is being received) that that database system has received the batch of data, thereby allowing the source system to perform any processing related to sending the batch of the data stream, for example, any resource cleanup operation. The database system executes 725 the batch, i.e., processes data for this batch. The processing of the data of the batch includes reading the data, processing the data, and writing the output. The database system writes 730 an entry to a commit log indicating that the processing of the batch is committed. Once the batch is committed the database system can proceed to process the next batch. The database system reports 735 any metrics related to the processing of the batch. The database system waits 740 if necessary, before starting processing of the next batch, for example, if the streaming data is being received slowly compared to the processing of the database query.

To execute batches in a pipelined fashion, the database system executes multiple micro-batches at the same time. The database system creates an execution context for each batch being executed for storing information such as metrics and state of the batch. The system synchronizes execution of some of the operations to ensure that the operations are performed in order to guarantee batch determinism and to ensure that the operation is performed only once. For example, the writes to the write ahead log are performed in order of the batches, the commit operations are written to the commit log in order of the batches, and metrics are reported in order of batches also.

The database system ensures that only the first batch creates any resources if they are determined to not exist, for example, any tables. This avoids race condition that may cause multiple batches to create the same resource. If the scheduler determines that a query is stateful, the scheduler ensures that the stateful stages are executed serially across batches.

Figure 8:
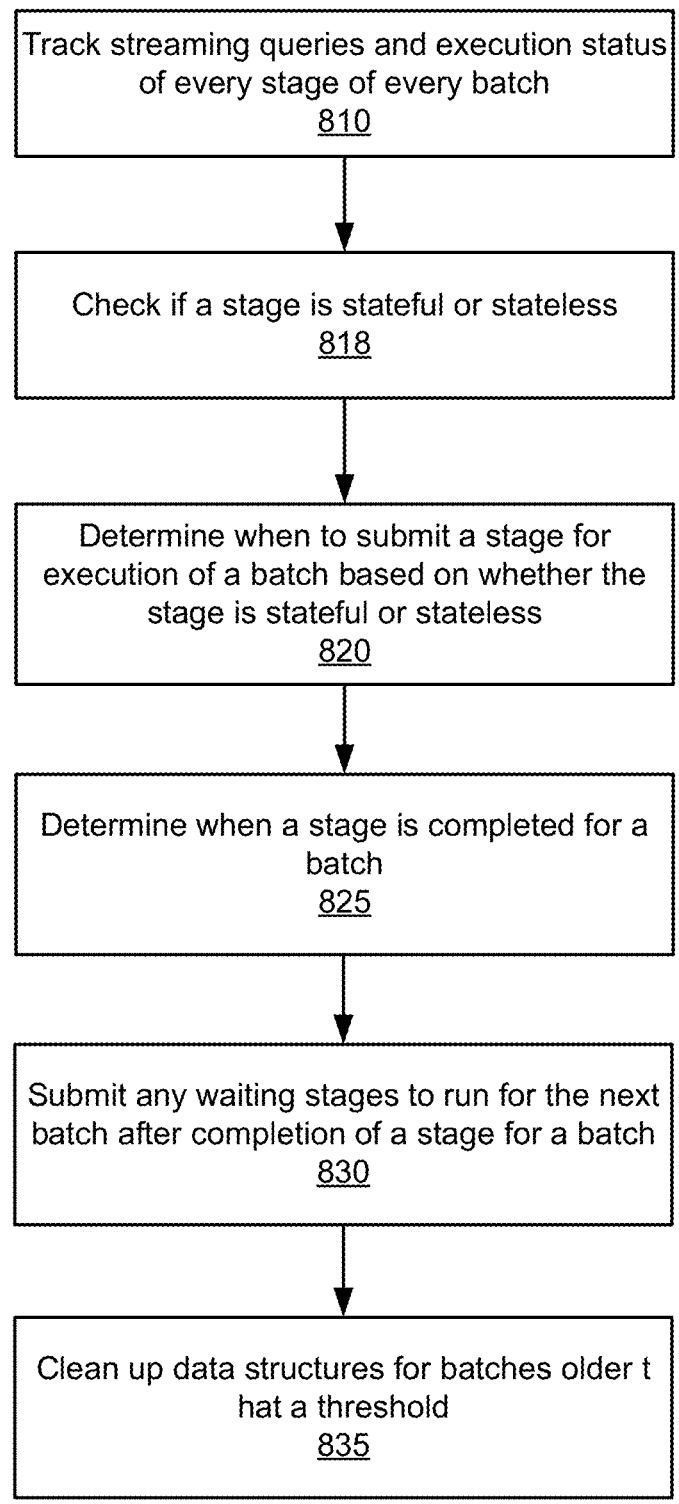
FIG. 8 is a flowchart illustrating the process executed by the scheduler for scheduling execution of stages of database queries, according to an embodiment.

FIG. 8 is a flowchart illustrating the process executed by the scheduler for scheduling execution of stages of database queries, according to an embodiment. The steps may of the process may be executed in an order different from that indicated in the flowchart. The steps are executed by a system, for example, a scheduler of a database system.

The scheduler tracks 810 all streaming database queries and execution status of every stage of every batch, for example, the execution status of each stage for each batch to determine when the execution begins and when the execution ends. The scheduler checks 815 if a stage is stateless or stateful. The scheduler may check the execution plan to determine whether the stage is stateful or stateless. For example, if the set of operators corresponding to a stage include certain specific operators that write data to the database, the database system marks the stage as stateful or else the database system marks the stage as stateless.

The scheduler determines 820 when to submit a stage for execution of a particular batch based on the determination, whether the stage is stateful or stateless. A stage is submitted for execution of a batch to the cluster, for example, to one or more workers. If a stage is stateful, the scheduler makes sure that the execution of the previous batch for this stage is completed before starting execution of this stage. If the execution of the stateful stage for the previous batch has not completed, the scheduler checks if there are any other stages (for example, parent stages) that can still be executed while the previous batch for this stage is executing. If the scheduler determines that the stage is stateless, the scheduler simply submits the batch for the stage for execution to the cluster.

The scheduler determines 825 when a batch completes execution of a stage. Once the execution of a stage for a batch is completed, the scheduler checks if there any waiting stages ion the next bath that are waiting for completion of this batch. If there are stages waiting for completion of this batch, the scheduler submits 830 them for execution to the cluster. The database system performs 835 cleanup of data structures or information tracking execution of stages for batches that are older than a threshold maximum number of outstanding batches that are allowed. The cleanup allows the system to reduce resource usage.

According to various embodiments the database system maintains a watermark representing a threshold timestamp value specifying how long the database system waits for late events. Accordingly, any data values for a batch that are received after the timestamp corresponding to the watermark are not processed. The database system keeps advancing the watermark as streaming data is processed. If an event that has a timestamp before the watermark is received by the database system, that event is ignored and not processed. As a result, a watermark bounds the amount of state of the streaming data that is stored.

FIG. 9A illustrates how watermark is advanced as streaming data is processed sequentially according to an embodiment. As shown in FIG. 9A, the database system processes all stages for a batch before starting the processing of any stage for the next batch. For example, processing of both stage 1 and stage 2 for batch 1 is completed before processing of stage 1 is started for batch 2. The watermark is updated after each batch is completed. The updated watermark is used by the next batch. During the query planning phase of a batch the watermark is used to compute the execution plan and the watermark is incorporated into the execution plan.

FIG. 9B illustrates how watermark is advanced as streaming data is processed in a pipelined manner according to an embodiment. With pipelined execution of the database query, the execution of a current batch may be started prior to the completion of the execution of the previous batch. This causes a situation in which batches may not get the most up-to-date watermark. In the example shown in FIG. 9B, because the execution of the batches is pipelined, execution of batch 2 starts before execution of batch 1 has completed.

According to an embodiment, the database system advances the watermark at the granularity of stages, i.e., the watermark is advanced from one stage to the next stage of the query processing a batch. For example, if execution of stage X for batch N−1 is completed the database system retrieves the output watermark of stage X in the batch N−1 and uses that as the current watermark for the stage X of the batch N and not the watermark that was set in the beginning of the batch N.

According to an embodiment, the watermark for a stage is determined based on the timestamp associated with the most recent data point of the previous batch (i.e., the maximum event time or the maximum timestamp value of data points of the previous batch). The watermark for a stage is determined by subtracting a threshold value from the timestamp associated with the most recent data point of the previous batch (i.e., or the maximum timestamp value of data points of the previous batch MINUS a threshold time value, e.g., 1 minute). The watermark for each stage is updated after the stage completes execution of a batch.

The database system updates watermark for a stage depending on whether the stage is stateless or stateful. The database system updates watermarks for stages that are stateful. Accordingly, the database system determines whether a stage is stateful and updates the watermarks after each execution of the stage for a batch of data. The database system does not update the watermark for a stage if the stage is determined to be stateless.

According to an embodiment, the scheduler determines a depth of the pipeline used for executing a database query. Accordingly, the scheduler determines the number of concurrent batches that may be executed at the same time. The scheduler also determines how the start of the batches is staggered, i.e., how long the database system waits before attempting to start execution of the next batch. The scheduler determines a moving average of batch execution times as a measure of batch execution times (referred to as batch_execution_time). The scheduler also determines an estimate of maximum number of pending batches (referred to as max_pending_batches). The estimate of maximum number of pending batches may be a configuration parameter that is set by a user. The scheduler determines the amount of time to wait (referred to as wait_time) before starting the next batch as ratio of the measure of batch execution time and the measure of maximum number of pending batches, i.e., the wait_time=batch_execution_time/max_pending_batches). The system dynamically adjusts the wait time to maximize cluster utilization. This embodiment has the benefit of limiting the maximum number of pending batches to prevent queries from consuming unexpected amount of resources.

Figure 10:
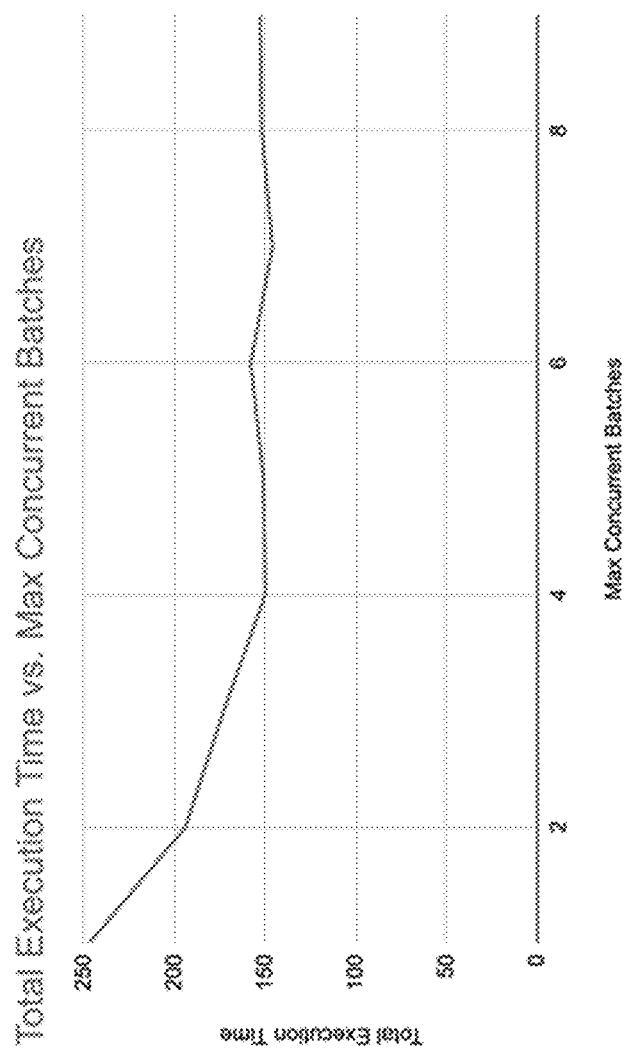
FIG. 10 shows the performance of pipelined execution of queries as the maximum number of concurrent batches executed are changed, according to an embodiment.

FIG. 10 shows the performance of pipelined execution of queries as the maximum number of concurrent batches executed are changed, according to an embodiment. The performance is measured using actual execution time of queries. The graph shown in FIG. 10 shows the total execution time of database queries using pipelined execution with respect to maximum concurrent batches used during the pipelined execution. As shown in the graph illustrated in FIG. 10, the total execution time improves as the maximum number of batches is increased up to a certain value of the maximum number of batches and then saturates. According to an embodiment, the system allows a user, for example, a database administrator to specify a default value of maximum concurrent batches for each database query.

Figure 11:
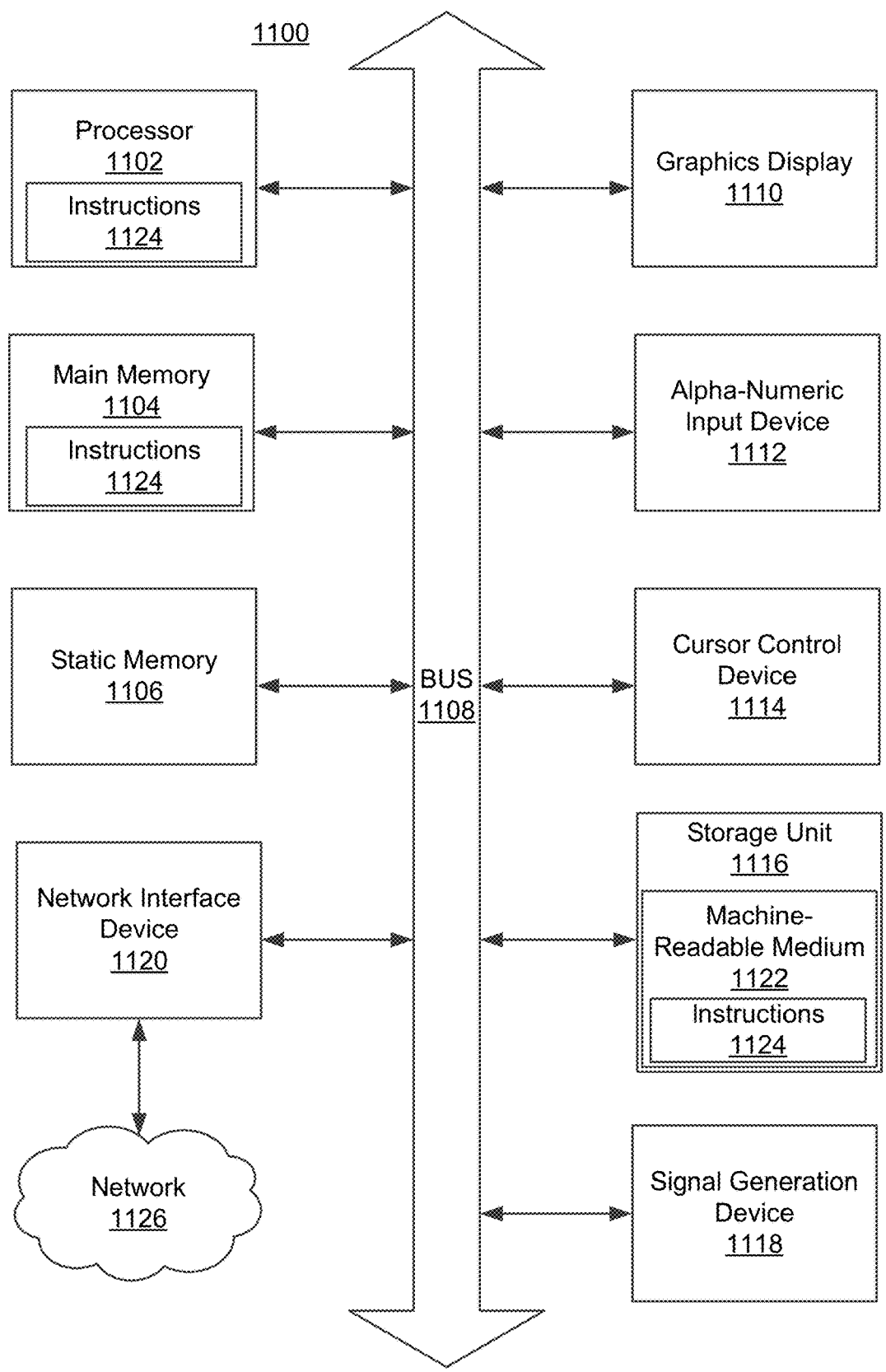
FIG. 11 is a block diagram illustrating an example machine to read and execute computer readable instructions, in accordance with an embodiment.

Turning now to FIG. 11, illustrated is an example machine to read and execute computer readable instructions, in accordance with an embodiment. Specifically, FIG. 11 shows a diagrammatic representation of the data processing service 102 (and/or data processing system) in the example form of a computer system 1100. The computer system 1100 can be used to execute instructions 1124 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processing units (generally processor 1102). The processor 1102 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 1100 also includes a main memory 1104. The computer system may include a storage unit 1116. The processor 1102, memory 1104, and the storage unit 1116 communicate via a bus 1108.

In addition, the computer system 1100 can include a static memory 1106, a graphics display 1110 (e.g., to drive a plasma display panel (PDP), a liquid crystal display (LCD), or a projector). The computer system 1100 may also include alphanumeric input device 1112 (e.g., a keyboard), a cursor control device 1114 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. For example, the instructions 1124 may include instructions for implementing the functionalities of the transaction module 330 and/or the file management module 335. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over a network 1126, such as the network 120, via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium that is capable of storing instructions 1124 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONFIGURATION CONSIDERATIONS

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A computer-implemented method for pipelined execution of streaming data using batches, the computer-implemented method comprising:
   receiving a database query for processing streaming data comprising a sequence of batches;
   compiling the database query to generate an execution plan comprising a plurality of operators;
   determining a set of stages of the database query, each stage of the database query corresponding to a subset of the plurality of operators of the execution plan of the database query, wherein at least a first stage of the database query generates output that is provided as input to a second stage of the database query for processing;
   receiving streaming data comprising the sequence of batches, each batch of the streaming data comprising a set of data values that are associated with a time interval, the streaming data comprising at least a first batch of the streaming data associated with a first time interval and a second batch of the streaming data associated with a second time interval that occurs after the first time interval;
   determining that the first stage is stateful across the sequence of batches; and
   responsive to determining that the first stage is stateful, scheduling pipelined execution of the first stage of the database query and the second stage of the database query and for each of the first and second batches, scheduling the pipelined execution comprising: (i) performing execution of the first stage processing the second batch of the streaming data after completion of execution of the first stage processing the first batch of the streaming data, wherein the first stage processing the second batch is not executed in parallel with the first stage processing the first batch; and (ii) performing execution of the first stage processing the second batch in parallel with execution of the second stage processing the first batch of the streaming data, wherein the first and second batches are at least partially executed in parallel while maintaining sequential processing for the first stage which is stateful across the sequence of batches.

2. The computer-implemented method of claim 1, wherein determining that the first stage is stateful comprises determining that a set of operators corresponding to the first stage includes at least an operator that stores data generated from the first stage processing the first batch of the streaming data, wherein the data generated is used for determining results based on the first stage processing the second batch of the streaming data.

3. The computer-implemented method of claim 1, wherein the set of stages of the database query comprise a third stage followed by a fourth stage, wherein scheduling the pipelined execution further comprises,
   determining that the third stage is stateless; and
   responsive to determining that the third stage is stateless, performing execution of the third stage processing the second batch of the streaming data in parallel with execution of the third stage of the database query processing the first batch of the streaming data.

4. The computer-implemented method of claim 3, further comprising,
   determining a watermark for each stage of the database query, wherein the watermark for a particular stage is determined based on a timestamp associated with a most recent data point of a previous batch processed by the particular stage of the database query.

5. The computer-implemented method of claim 4, further comprising,
advancing the watermark for the particular stage of the database query for a current batch after processing the particular stage using data of the current batch.

6. The computer-implemented method of claim 1, further comprising,
determining a maximum number of batches executed concurrently as a ratio of a measure of batch execution time and a measure of maximum number of pending batches.

7. A non-transitory computer readable medium comprising stored instructions, the stored instructions when executed by at least one processor of one or more computing devices, cause the one or more computing devices to:
receive a database query for processing streaming data comprising a sequence of batches;
compile the database query to generate an execution plan comprising a plurality of operators;
determine a set of stages of the database query, each stage of the database query corresponding to a subset of the plurality of operators of the execution plan of the database query, wherein at least a first stage of the database query generates output that is provided as input to a second stage of the database query for processing;
receive streaming data comprising the sequence of batches, each batch of the streaming data comprising a set of data values that are associated with a time interval, the streaming data comprising at least a first batch of the streaming data associated with a first time interval and a second batch of the streaming data associated with a second time interval that occurs after the first time interval;
determine that the first stage is stateful across the sequence of batches; and
responsive to determining that the first stage is stateful, schedule pipelined execution of the first stage of the database query and the second stage of the database query and for each of the first and second batches by causing the one or more computing devices to: (i) perform execution of the first stage processing the second batch of the streaming data after completion of execution of the first stage processing the first batch of the streaming data, wherein the first stage processing the second batch is not executed in parallel with the first stage processing the first batch; and (ii) perform execution of the first stage processing the second batch in parallel with execution of the second stage processing the first batch of the streaming data, wherein the first and second batches are at least partially executed in parallel while maintaining sequential processing for the first stage which is stateful across the sequence of batches.

8. The non-transitory computer readable medium of claim 7, wherein the instructions that cause the one or more computing devices to determine that the first stage is stateful comprise instructions that cause the one or more computing devices to determine that a set of operators corresponding to the first stage includes at least an operator that stores data generated from the first stage processing the first batch of the streaming data, wherein the data generated is used for determining results based on the first stage processing the second batch of the streaming data.

9. The non-transitory computer readable medium of claim 7, wherein the set of stages of the database query comprise a third stage followed by a fourth stage, wherein the instructions that cause the one or more computing devices to schedule the pipelined execution further comprise instructions that cause the one or more computing devices to:
determine that the third stage is stateless; and
responsive to determining that the third stage is stateless, perform execution of the third stage processing the second batch of the streaming data in parallel with execution of the third stage of the database query processing the first batch of the streaming data.

10. The non-transitory computer readable medium of claim 7, wherein the stored instructions further cause the one or more computing devices to:
determine a watermark for each stage of the database query, wherein the watermark for a particular stage is determined based on a timestamp associated with a most recent data point of a previous batch processed by the particular stage of the database query.

11. The non-transitory computer readable medium of claim 10, wherein the stored instructions further cause the one or more computing devices to:
advance the watermark for the particular stage of the database query for a current batch after processing the particular stage using data of the current batch.

12. The non-transitory computer readable medium of claim 7, wherein the stored instructions further cause the one or more computing devices to:
determining a maximum number of batches executed concurrently as a ratio of a measure of batch execution time and a measure of maximum number of pending batches.

13. A computer system, comprising:
a computer processor; and
a non-transitory computer-readable storage medium comprising instructions that when executed by the computer processor, cause the computer system to:
receive a database query for processing streaming data comprising a sequence of batches;
compile the database query to generate an execution plan comprising a plurality of operators;
determine a set of stages of the database query, each stage of the database query corresponding to a subset of the plurality of operators of the execution plan of the database query, wherein at least a first stage of the database query generates output that is provided as input to a second stage of the database query for processing;
receive streaming data comprising the sequence of batches, each batch of the streaming data comprising a set of data values that are associated with a time interval, the streaming data comprising at least a first batch of the streaming data associated with a first time interval and a second batch of the streaming data associated with a second time interval that occurs after the first time interval;
determine that the first stage is stateful across the sequence of batches; and
responsive to determining that the first stage is stateful, schedule pipelined execution of the first stage of the database query and the second stage of the database query and for each of the first and second batches by causing the computer system to: (i) perform execution of the first stage processing the second batch of the streaming data after completion of execution of the first stage processing the first batch of the streaming data, wherein the first stage processing the second batch is not executed in parallel with the first stage processing the first batch; and (ii) perform execution of the first stage processing the second batch in parallel with execution of the second stage processing the first batch of the streaming data, wherein the first and second batches are at least partially executed in parallel while maintaining sequential processing for the first stage which is stateful across the sequence of batches.

14. The computer system of claim 13, wherein the instructions that cause the computer system to determine that the first stage is stateful comprise the instructions that cause the computer system to determine that a set of operators corresponding to the first stage includes at least an operator that stores data generated from the first stage processing the first batch of the streaming data, wherein the data generated is used for determining results based on the first stage processing the second batch of the streaming data.

15. The computer system of claim 13, wherein the set of stages of the database query comprise a third stage followed by a fourth stage, wherein the instructions that cause the computer system to schedule the pipelined execution further comprise instructions that cause the computer system to:

determine that the third stage is stateless; and responsive to determining that the third stage is stateless, perform execution of the third stage processing the second batch of the streaming data in parallel with execution of the third stage of the database query processing the first batch of the streaming data.

16. The computer system of claim 13, wherein the instructions further cause the computer system to:

determine a watermark for each stage of the database query, wherein the watermark for a particular stage is determined based on a timestamp associated with a most recent data point of a previous batch processed by the particular stage of the database query.

17. The computer system of claim 16, wherein the instructions further cause the computer system to:

advance the watermark for the particular stage of the database query for a current batch after processing the particular stage using data of the current batch.

* * * * *